May 26, 1959 A. L. GENOVESE, SR., ET AL 2,888,215
WINDING APPARATUS
Filed July 13, 1955 7 Sheets-Sheet 1

INVENTORS
A.L.Genovese,Sr., W.W.Batchelor,Jr.,
P.A.Belli, D.L.Garlock & A.L.Genovese,Jr.
BY Karl W. Flocks
ATTORNEY May 26, 1959　　A. L. GENOVESE, SR., ET AL　　2,888,215
WINDING APPARATUS Filed July 13, 1955　　　　　　　　　　　　　　　7 Sheets-Sheet 2

INVENTORS
A.L.Genovese, Sr., W.W.Batchelor, Jr.,
P.A.Belli, D.L.Garlock and A.L.Genovese, Jr.

BY　Karl W. Flocks

ATTORNEY

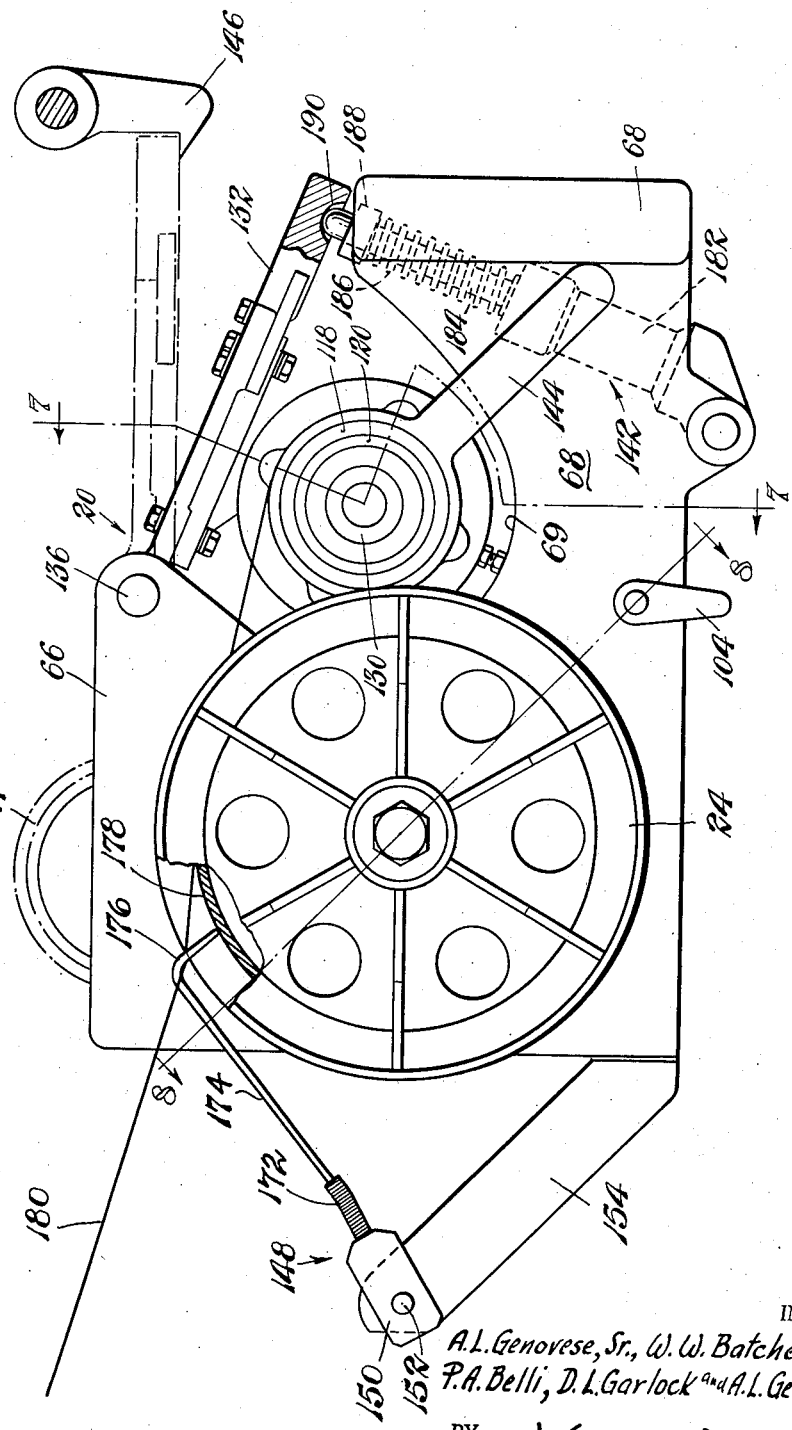

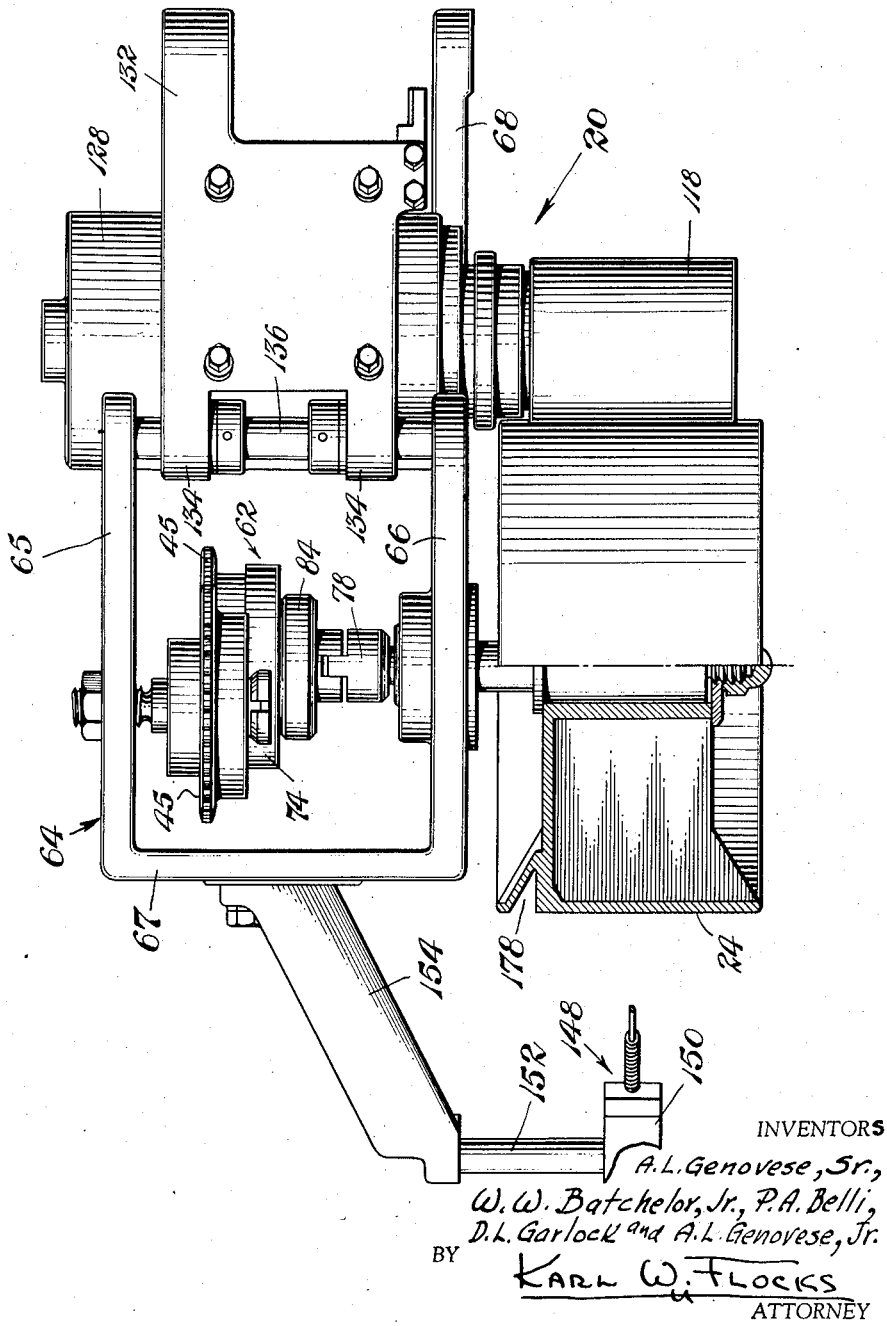

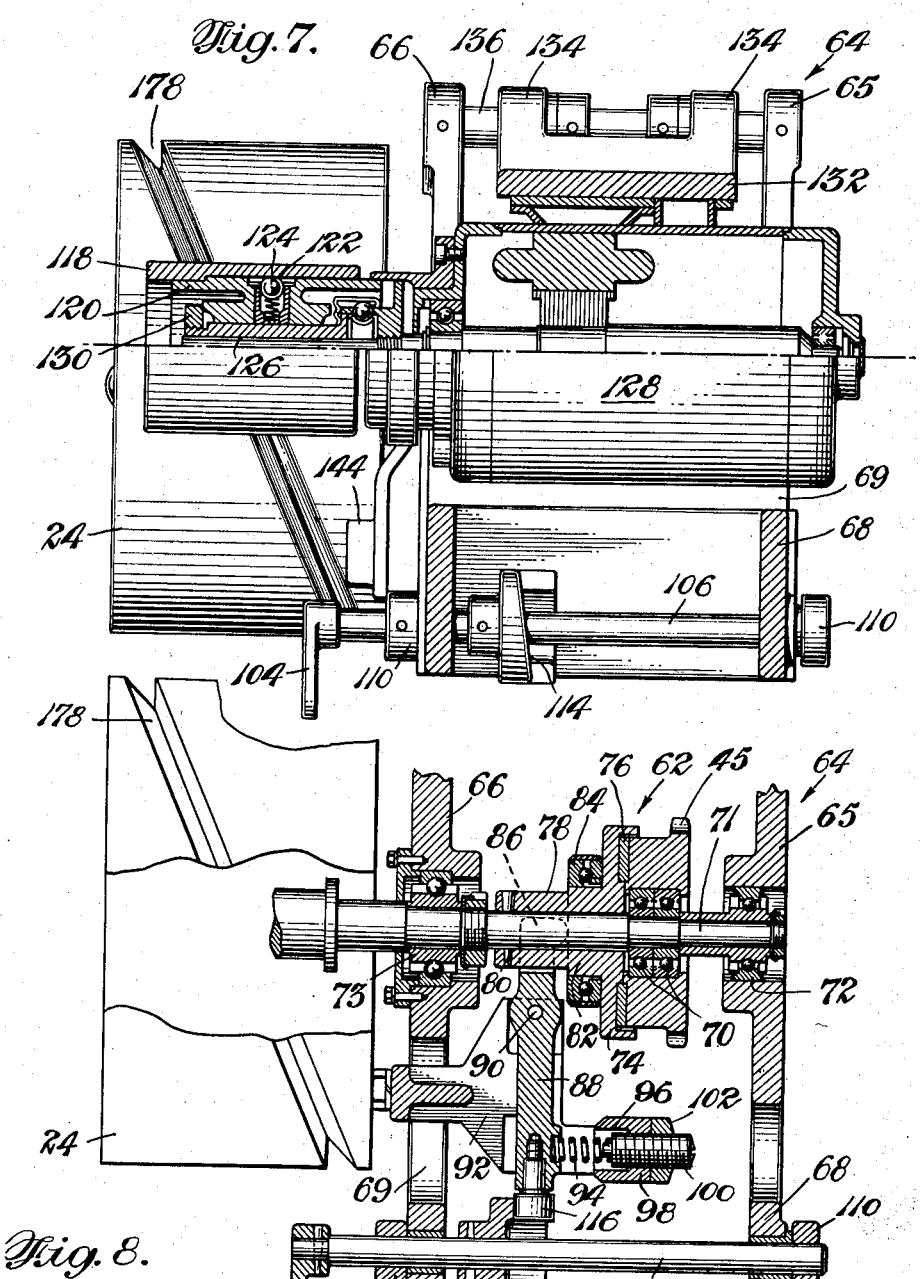

May 26, 1959  A. L. GENOVESE, SR., ET AL  2,888,215
WINDING APPARATUS
Filed July 13, 1955  7 Sheets-Sheet 7
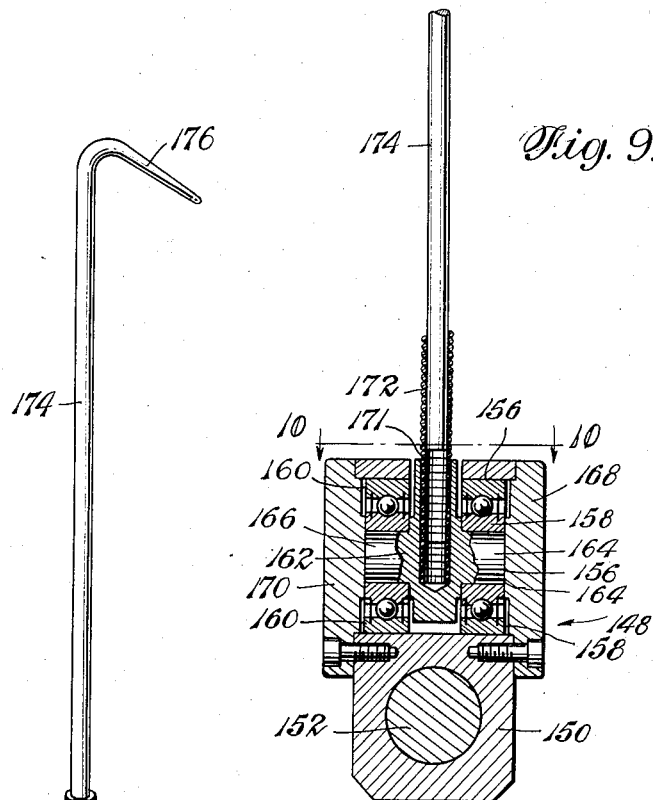
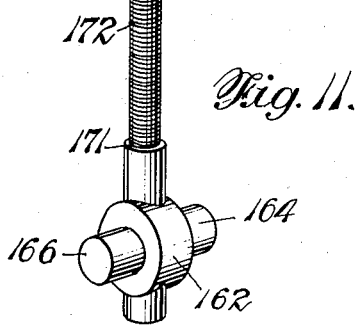
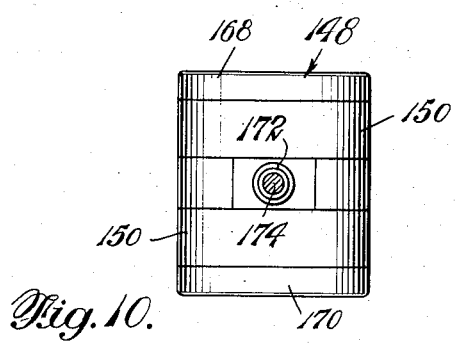
INVENTOR
A.L.Genovese,Sr., W.W.Batchelor,Jr.,
P.A.Belli, D.L.Garlock and A.L.Genovese,Jr.
BY  Karl W. Flocks
ATTORNEY

United States Patent Office 2,888,215
Patented May 26, 1959

2,888,215
WINDING APPARATUS

Anthony L. Genovese, Sr., Odenton, and Wallace W. Batchelor, Jr., Philip A. Belli, Donald L. Garlock, and Anthony L. Genovese, Jr., Baltimore, Md., assignors to The Saran Yarns Company, Odenton, Md., a corporation of Maryland Application July 13, 1955, Serial No. 521,778

28 Claims. (Cl. 242—35.5)

The present invention relates to winding apparatus. More particularly, the present invention relates to a winding machine that includes a plurality of individual winding units, each of the winding units being adapted to wind a continuously moving thread or filament on a rotating core.

The winding apparatus embodied herein is adapted for particular use with extrusion machines of the hot-melt type wherein a plurality of artificial filaments are continuously extruded therefrom. The filaments are normally separated into groups by appropriate orienting means and are directed to winding apparatus. Prior to the instant invention, the winding apparatus known heretofore included means for winding the groups of filaments on individual cores, but these prior winding devices did not include a separate control for each winding unit. Moreover, these prior winding devices necessarily utilized a common traversing device for effecting the winding operation of all the groups of filaments. Thus, if the traversing mechanism failed the entire winding operation was halted.

The prior known multiple core winding machines which were adapted to wind a plurality of separately extending threads or filaments on traversing cores, wound the filaments in side-by-side relation in much the same manner as the household thread is wound on a spool. It has been found desirable to wind the extruded filaments on a core in a manner simulating a helix, thereby effecting a finished package that enables the filament to be easily transferred to other bobbins or easily withdrawn from the package.

The heretofore known winding machines also did not provide means for taking up the length of the continuously moving filament that accumulated when the operator of the machine replaced the finished package with a fresh core. It was the usual practice in these prior known machines for the operator of the machine to manually wind the accumulated material on the fresh core during the core replacing operation. However, such a practice was found to be objectionable since the filament was subject to breaking and, moreover, the tension of the filament engaging the core was varied, thereby varying the load on the core when the package was complete. It is known that if the filament is initially wound too tightly on the core the pressure created when the package is completed oftentimes causes the core to crack. If the filament is wound too loosely on the core, the package develops high spots and must be replaced. Thus, it is important in initially starting the filament on the core to wind the filament at a constant tension, thereby insuring an evenly finished package.

It is therefore an object of the present invention to provide a winding machine for use with a continuously moving filament, wherein the length of the moving filament accumulated during a core changing operation is automatically taken up.

Another object of the present invention is to provide a multiple core winding machine wherein a plurality of winding units are provided, each of said units including a filament receiving core that is continuously rotated for receiving a continuously moving filament thereon in winding relation.

Still another object of the present invention is to provide winding apparatus wherein a filament receiving core is rotated in the filament winding position by a first rotating means and is rotated in the core-changing position by a second rotating means.

Still another object of the present invention is to provide winding apparatus wherein a filament receiving core is adapted to be pivotally moved out of the winding position during the core changing operation.

Still another object of the present invention is to provide a guide means for a continuously moving filament onto a core during the winding operation, the guide means being traversed by a traversing device for guiding the filament onto the core and the core being frictionally driven by the traversing device.

Still another object of the present invention is to provide a multiple unit winding machine, wherein each of the winding units is provided with a traversing device for winding a helically formed package.

Other objects and the nature and advantages of the instant invention will be apparent from the following description taken in conjunction with the accompanying drawings, wherein:

Fig. 5 is a side elevational view of one of the winding units illustrated in Fig. 1 with parts shown in section;

Fig. 6 is a plan view of the winding unit illustrated in Fig. 5 with parts shown in section;

Fig. 7 is a sectional view taken along the line 7—7 of Fig. 5;

Fig. 8 is a sectional view taken along the line 8—8 of Fig. 5;

Fig. 9 is a vertical sectional view of the filament guide means embodied in the present invention;

Fig. 10 is a view taken along the line 10—10 of Fig 9; and

Fig. 11 is a perspective view of the rotatable bearing shaft shown in Figs. 9 and 10.

The multiple winding unit machine embodied herein is adapted for particular use with extrusion apparatus wherein groups of filaments are extruded therefrom in a continuous manner and therefore must be continuously wound. It is understood, however, that although the apparatus described herein is to be utilized in a particular manner, other filament or thread feeding apparatus may be employed therewith without departing from the spirit of the invention.

Figure 1:
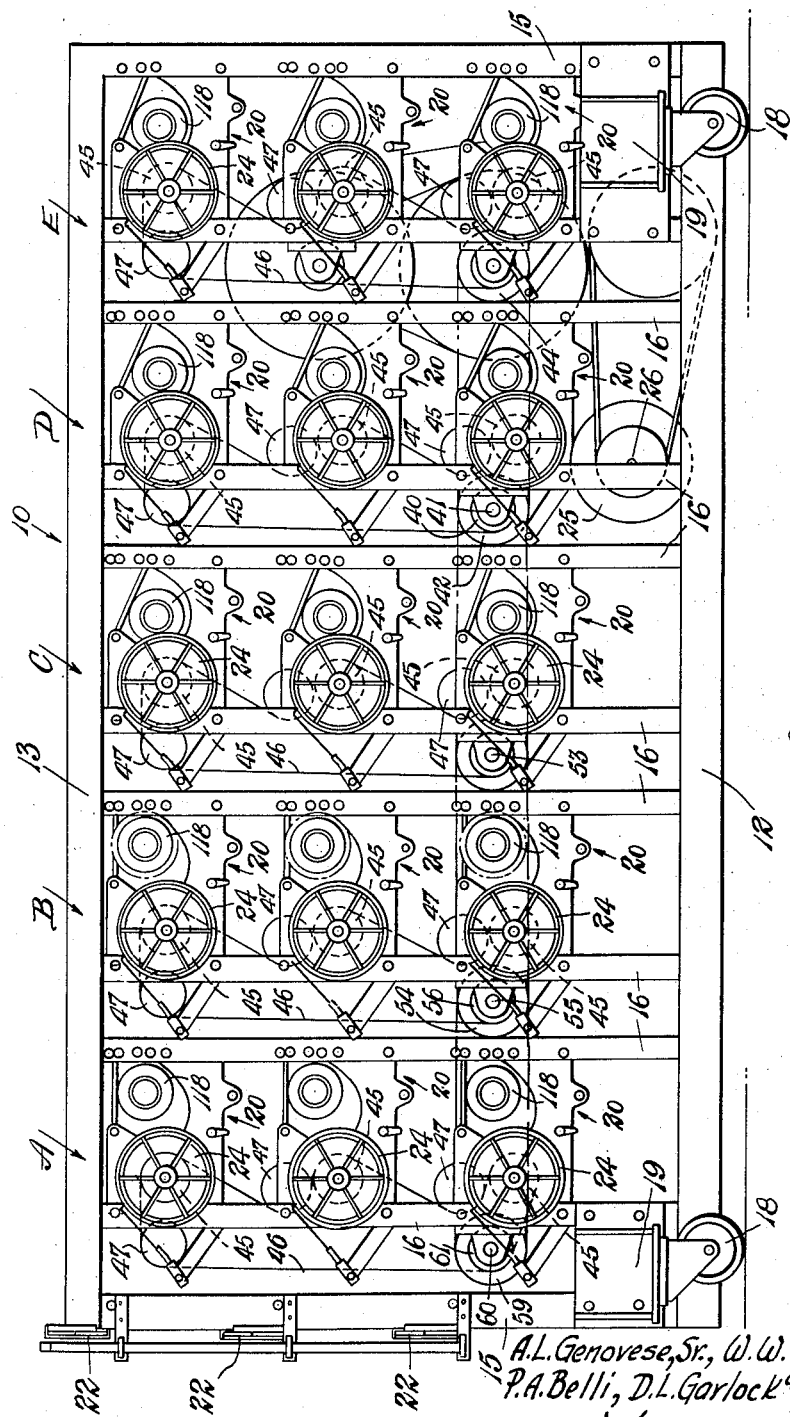
Fig. 1 is a side elevational view of the multiple unit winding machine embodied in the present invention.
Figure 2:
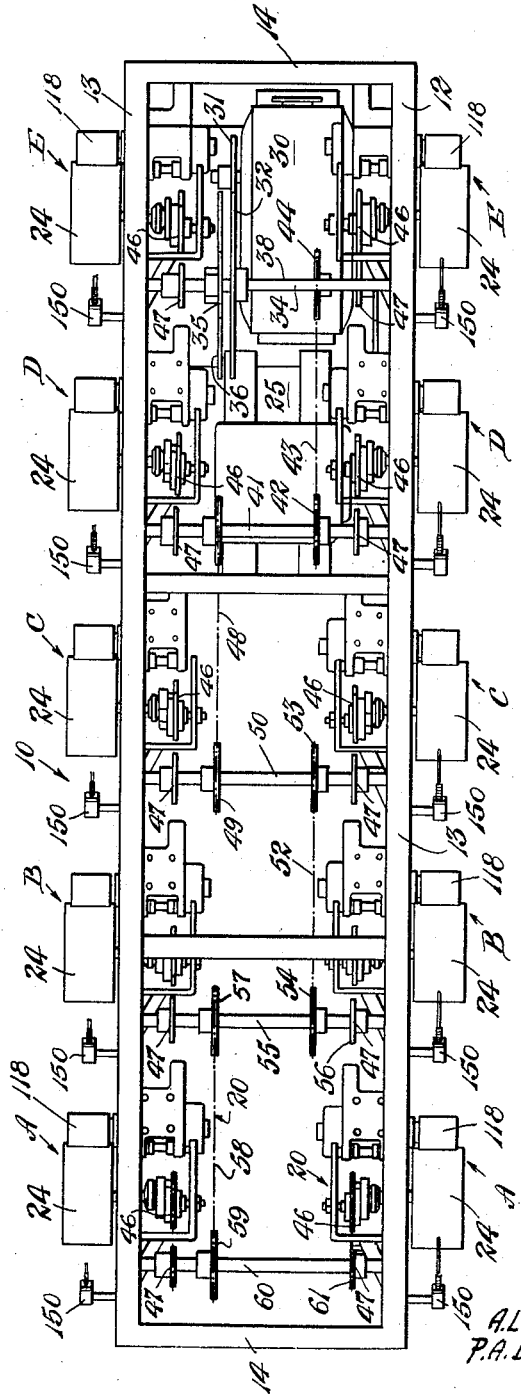
Fig. 2 is a top plan view of the winding machine illustrated in Fig. 1.

Referring now to the drawings, and particularly Figs. 1 and 2, the multiple unit winding machine embodied herein is illustrated and includes a frame generally indicated at 10 that comprises spaced longitudinally extending bottom beams 12 and spaced top beams 13. End beams 14 interconnect the spaced bottom beams 12 and top beams 13 and vertical end beams 15 and intermediate vertical rails 16 are secured between the top and bottom beams 12, 13, the intermediate vertical rails 16 being arranged in spaced intervals and on both sides of the winding machine frame. The frame 10 is adapted to be portable in usage and for this purpose is provided with suitable casters 18 that are secured in caster frames 19 which are in turn mounted on the vertical rails 16 and end beams 15 positioned at the corners of the frame 10. As shown in Figs. 1 and 2, a plurality of winding units 20 are secured between the vertical rails 16 of the frame 10 and are arranged in banks of three units. The banks of the winding units 20 are indicated in Fig. 1 at A, B, C, D and E and as shown comprise eighteen units on each side of the frame 10. Each of the units 20 is adapted to wind a plurality of threads or filaments directed thereto from a convenient source, such as an extrusion machine. In order to guide the filaments from the extrusion machine to each of the winding units 20, filament guides 22 are secured to the rail 15 of the frame 10 and are illustrated at the extreme left end of the frame, as seen in Fig. 1. It is understood that each filament guide 22 directs the moving filaments to each of the units 20 in the same row in which it is located. Each of the winding units 20 is adapted to be separately driven, the driving means comprising a traverse drum 24 which also provides means for traversing the filament being wound on a filament receiving core. The traversing and winding operation will be described in more detail hereinafter.

Figure 3:
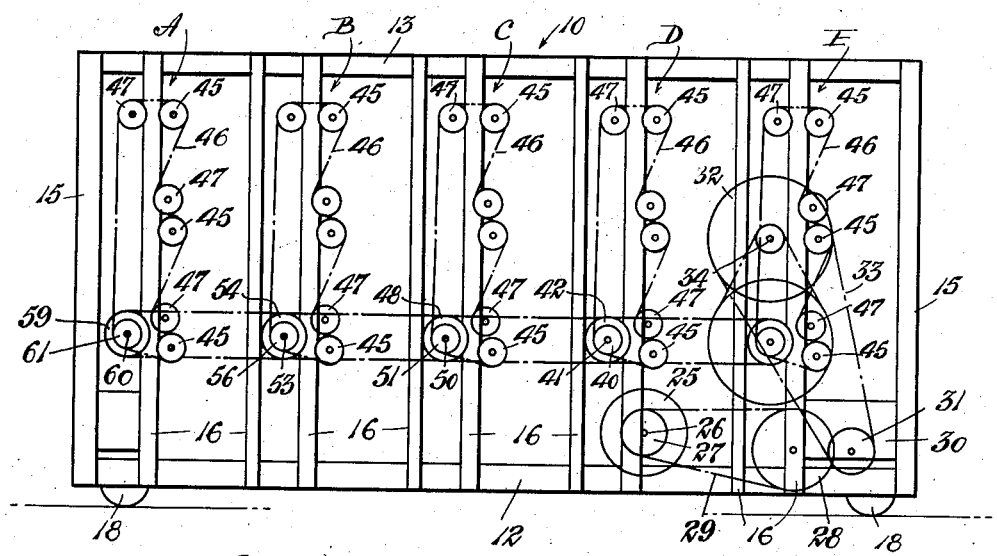
Fig. 3 is a side elevational view of the multiple unit winding machine frame illustrating the interconnection of the drive for the individual winding units.
Figure 4:
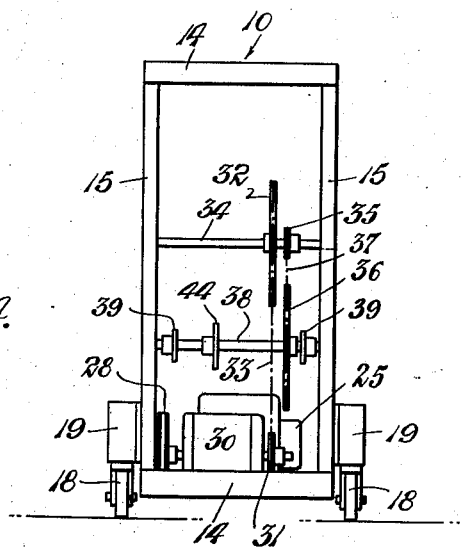
Fig. 4 is a front elevational view of the winding machine frame and the drive mounted thereon shown in Fig. 3.

As illustrated in Figs. 1 and 2, the traverse drums 24, which form the drive means for driving the cores upon which the groups of filaments are wound, are adapted to be driven from a common driving unit mounted on the frame 10. Referring now to Figs. 2, 3 and 4, the driving unit is illustrated and includes a power source in the form of an electric motor 25. Secured to a shaft 26 driven by the electric motor 25 is a sprocket gear 27 which is operatively connected to a sprocket gear 28 through a sprocket chain 29. The sprocket gear 28 is secured to the input shaft of a speed reducer 30 which also has a sprocket gear 31 secured to the output shaft thereof. As shown more clearly in Fig. 4, the sprocket gear 31 drives a sprocket gear 32 through a chain 33, the sprocket gear 32 being secured to a shaft 34 journalled for rotation in the frame 10. Also secured to the shaft 34 is a sprocket gear 35 which drives a sprocket gear 36 through a chain 37. The sprocket gear 36 is secured to a shaft 38 journalled in the frame 10, the shaft 38 being adapted to rotate sprocket gears 39 secured thereto, the sprocket gears 39 forming the driving means for driving the winding units 20 positioned in the E banks. Referring to Fig. 3, the drive for the winding units is particularly illustrated and for the purpose of clarity in describing the drive, reference is made to the D banks of the winding units. The winding units in the D banks are responsive to rotation of sprocket gears 40 which are similar to gears 39, the sprocket gears 40 being secured to a shaft 41 journalled in the frame 10 (see Fig. 2). The shaft 41 has a sprocket gear 42 secured thereto that operatively engages a chain 43 driven by a sprocket gear 44 which is secured to the shaft 38 in the E banks. In order to drive the winding units 20 in the D banks, drive sprocket gears 45 are journalled in each winding unit frame on both sides of the frame 10 and are adapted to engage a sprocket chain 46 associated with each bank of winding units, each of the chains 46 being driven by the associated sprocket gear 40. An idler gear 47 is associated with each winding unit 20 and is journalled in the frame 10, being provided for tensioning the sprocket chain 46. It is seen that upon rotation of the shaft 41 by the sprocket gear 42, the gears 40 will be rotated to drive the chain 46. Since the sprocket drive gears 45 engage the chain 46, they will be driven to drive the corresponding winding unit 20. It is understood that the winding units in the A, B, C, D and E banks are driven on both sides of the frame in a similar manner described above in connection with the D banks. As shown in Fig. 2, the drive is transferred from shaft 41 of the D banks to the adjacent C banks by a sprocket chain 48 that engages a sprocket gear 49 secured to a shaft 50 journalled in the frame 10. The shaft 50 has secured thereto sprocket gears 51, similar to sprocket gears 40, the gears 51 engaging a chain 46 that is adapted to drive a plurality of winding unit sprocket drive gears 45 (Fig. 4). The winding units on the B banks are driven by a chain 52 engaging a sprocket gear 53 secured to the shaft 50 and also engaging a sprocket gear 54 secured to a shaft 55 journalled in the frame 10. Secured to the shaft 55 are sprocket gears 56 that are adapted to drive a sprocket chain 46, as described above. The shaft 55 has a sprocket gear 57 secured thereto which engages a chain 58 and thus drives the winding units 20 in the A banks through the sprocket gear 59 secured to a shaft 60 journalled in the frame 10 and the sprocket gears 61 secured to the shaft 60.

It is seen that all of the winding units 20 are adapted to be continuously operated by the electric motor 26 during the winding operation, the drive shafts in each bank of units transferring the drive to the drive shaft in the adjacent bank of units.

In order to more clearly illustrate the manner in which each individual winding unit 20 is driven, reference is now made to Figs. 5–8, wherein one of the winding units 20 is shown. As described hereinabove, the drive to the winding unit 20 is for the purpose of rotating the traverse drum 24 which comprises the driving element for rotating a filament receiving core. It is sometimes desirable to declutch an individual winding unit from driving engagement and for this purpose a clutch assembly generally indicated at 62 in Fig. 8 is provided. The clutch assembly 62 is mounted in a U-shaped bracket generally indicated at 64, which is secured to a pair of the vertical rails 16, as shown in Fig. 1. As shown in Figs. 5 and 6, the bracket 64 includes parallel side walls 65 and 66 and an end wall 67. The side wall 66 is formed with an extension 68 and provided with a cut-out or saddle portion 69, the purpose of which will be described hereinafter. The clutch assembly 62 includes the sprocket drive gear 45 that operatively engages the sprocket chain 47 and is driven by the appropriate gear secured to the corresponding drive shaft journalled for rotation in the frame 10 as described above. The drive sprocket gear 45 is rotatably mounted on a pair of ball bearings 70 that are secured to a clutch shaft 71, the clutch shaft 71 being journalled for rotation in end bearings 72 and 73 mounted in the side walls 65 and 66 of the U-shaped frame 64. The clutch shaft 71 extends beyond the side wall 66 of the frame 64, as seen in Fig. 8, and receives the drum 24 thereon for rotation therewith. Mounted on the shaft 71 for rotation therewith is a clutch plate 74 that is provided with a friction disc 76 for engaging the face of the sprocket drive gear 45. The clutch plate 74 is formed with an extension 78 which is secured to the shaft 71 by a pin 80, thereby positively securing the clutch plate 74 to the shaft 71. Positioned around a flange portion 82 of the extension 78 is a bearing 84 that abuts against the rear face of the clutch plate 74 and receives a yoke 86 in abutting relation therewith. The yoke 86 envelopes the extension 78 and is adapted to be actuated for clutching the clutch plate 74 into and out of driving relation with the sprocket drive gear 45. The yoke 86 includes an integral extension 88 that is pivoted at 90 to a stationary bracket 92 secured to the wall 66 of the frame 64. The lower end of the yoke extension 88 is provided with a slot for receiving a tension spring 94 which extends into an opening 96 formed in a stationary block 98, the block 98 being formed integral with the bracket 92. The block 98 threadedly receives an adjustment screw 100 which abuts against the spring 94 and is held in the adjusted position by a lock nut 102. It is seen that the tension spring 94 abutting against the lower end of the yoke extension 88 causes the yoke 86 to be moved to the right as seen in Fig. 8 and into engagement with the bearing 84, thereby clutching the clutch plate 74 and the friction disc 76 to the sprocket drive gear 45 and locking the shaft 71 in driving relation to the sprocket drive gear. Since the clutch plate 74 is operatively secured to the shaft 71, the sprocket drive gear 45 will drive therethrough to drive the traverse drum 24. In order to disengage the traverse drum 24 from driving engagement with the sprocket gear 45, a manually operated handle 104 is provided. The handle 104 is secured to a cam shaft 106 that is journalled in the walls 65 and 66 of the U-shaped frame 64 by suitable bearings 108, the handle 104 being positioned exteriorly of the wall 66 for easy access by the operator of the machine. Collars 110 are pinned to the cam shaft 106 for preventing endwise movement thereof. Secured to the cam shaft 106 between the bearings 108 is a cam 112, the cam 112 having a bevelled face 114 which, as shown in Fig. 8, is adapted to engage a cam follower 116. The cam follower 116 is secured to the lower end of the yoke extension 88, as seen in Fig. 8, and is thus adapted to pivotally move the yoke extension 88 in response to movement of the cam 112. It is seen that by rotating the cam shaft 106 by the handle 104, the bevelled face 114 of the cam 112 will tend to displace the cam follower 116, thereby pivoting the yoke extension 88 and the yoke 86 integrally joined to the yoke extension. Thus, it is seen that the traverse and drive drum 24 may be clutched into and out of engagement with the sprocket drive gear 45 by simply actuating the handle 104, as desired.

In the filament winding operation, the traverse drum 24 has a two-fold purpose, being adapted to traverse the continuously moving filament to cause the filament to be wound on a filament receiving core and also serving to rotate the filament receiving core. As shown in Figs. 5-8, the traverse drum 24 is adapted to frictionally engage a filament receiving core 118 mounted on a core holder 120. The core 118 is provided with a detent 122 on the inner surface thereof, which receives a spring loaded ball 124 for releasably locking the core 118 to the core holder 120. The core holder 120 is locked to a shaft 126 of an electric motor 128 by a nut 130 which threadedly engages the outermost end of the motor shaft 126. During the winding operation, the electric motor 128 is continuously energized and is adapted to rotate the core holder 120 and core 118 secured to the core holder. However, in the winding operation, the core 118 frictionally engages the drum 24 which overrides the electric motor 128 and rotates the core 118 at the speed of the drum. As will be described in more detail hereinafter, when the core 118 is completely wound into a package and is replaced by a fresh core, the electric motor rotates the fresh core prior to commencement of the winding operation to take up the length of any material accumulated during the core changing operation. The electric motor 128 is secured to a bracket 132 that is mounted for pivotal movement with respect to the U-shaped frame 64 and for this purpose is formed with bearing members 134 that receive a shaft 136 secured to the walls 65, 66 of the U-shaped frame 64 at the open end thereof. It is seen that the bracket assembly, which includes the core 118, core holder 120, electric motor 128 and bracket 132 are adapted to pivotally move with respect to the frame 64 and in order to provide for the movement, the side wall 66 of the frame is formed with the saddle portion 69 that receives the bracket assembly in the lowered position thereof. The side wall 66 of the frame also includes the extension 68 which defines the saddle portion 69, the extension 68 having a dash-pot generally indicated at 142 secured thereto, the purpose of which will be described hereinafter. In order to pivotally move the bracket assembly out of engagement with the drum 24, a handle 144 is provided and is operatively secured to the shaft 126 of the motor 128. A latch 146 is pivotally secured to a vertical rail 16 of the frame 10 and is adapted to hold the bracket assembly in the upper position as shown in dotted lines in Fig. 5.

In order to guide the filament being extruded to the core 118, a guide assembly generally indicated at 148 is provided and is shown particularly in Figs. 5, 6, 9 and 10. The guide assembly 148 includes a block 150 that is secured to a stub shaft 152, the stub shaft 152 being secured to an extension arm 154 bolted to the end wall 67 of the U-shaped frame 64. Referring particularly to Figs. 9 and 10, the block 150 is shown being formed with a bore 156 therein that receives bearings 158 and 160 in spaced relation. A bearing shaft 162 (Fig. 11) is positioned in the opening 156, in the bearing block 150, and is provided with bearing portions 164 and 166 for engaging the bearings 158 and 160 for oscillating movement therebetween. Plates 168 and 170 are bolted to the block 150 and firmly secure the bearings 158, 160 and shaft 162 in position. The bearing shaft 162 is provided with an opening 171 therein (Fig. 11) that is adapted to receive a spring 172, the spring 172 being rotatable with the bearing shaft 162. Extending outwardly from the spring 172, as shown in Fig. 9, and secured thereto is a follower arm 174 that terminates in a finger 176. Referring again to Fig. 5, the finger 176 is shown extending into a helical groove 178 formed in the traverse drum 24 and is adapted to follow the helical groove as the drum 24 rotates. It is seen, therefore, that as the drum 24 rotates, the follower arm 174 will be caused to traverse by following the helical groove 178, thereby rotating the bearing shaft 162 of the guide assembly between the bearings 158 and 160. The spring 172 further acts to tension the follower arm 174 so that the finger 176 is positively urged into the groove 178 of the drum 24. As shown in Fig. 5, a filament 180 that is being continuously advanced from a suitable source engages the finger 176 of the follower arm 174 and is thereby guided in traversing motion during the winding operation.

In the winding operation, the bracket assembly including the core 118 is moved to the lower position in the saddle 69 formed in the wall 66 of the frame 64, the core 118 frictionally engaging the drum 24, thereby being rotated by the drum 24. The weight of the bracket assembly, which includes the bracket 132, motor 128, core holder 120, and core 118, forces the core 118 to remain in the lower position and to be frictionally driven by the drum 24 at the speed of the drum. It is seen, therefore, that during the winding operation, the filament 180 when initially secured to the core 118 will be continuously wound on the core and traversed thereon by the follower arm 174, thereby being evenly distributed over the entire length of the core in a helical formation. When the core 118 has been sufficiently wound to complete the package, it must be replaced with a fresh core and it is then necessary to move the finished package out of engagement with the drum 24 and remove the finished package from the core holder 120. For this purpose, the handle 144 is provided and is adapted to move the bracket assembly to an upper position, the bracket 132 being engaged by the pivoted latch 146, as shown in dotted lines in Fig. 3. The filament 180 is severed and the package is removed from the core holder 120 and a fresh core inserted on the core holder 120. It is also contemplated to position the latch 146 such that as the package builds up during the winding operation and the bracket assembly is advanced away from the drum 24, the bracket 132 will automatically engage the latch indicating that the package is to be replaced.

During the period of time when the finished package is replaced by a fresh core, the filament 180 is continuously advancing due to the continuous extruding operation of the extruding machine and a length of the filament is thus accumulated. Since the motor 128 is continuously energized and will rotate the core holder 120 when the wound package is removed from engagement with the traverse drum 24 and a fresh core is placed on the core holder 120 with the bracket assembly in the latched position, the fresh core will be caused to rotate immediately. Thus, when the fresh core is placed in position on the core holder 120, any of the filament 180 that has accumulated during the core replacing operation is quickly wound on the fresh core. It is seen that since the speed of the motor 128 is greater than the speed of the drum 24, the accumulated filament will be quickly wound on the fresh core. It is understood that the filament is first, hand started on the fresh core but the rotation of the core by the motor 128 then begins the winding operation. In order to continue the winding operation, the pivoted latch 146 is released, causing the bracket assembly to fall to the lower position, whereby the fresh core engages the traverse drum 24 and is frictionally driven thereby, the slower rotating drum 24 overriding and controlling the drive of the normally faster rotating electric motor 128.

In order to damp the movement of the bracket assembly in the movement thereof to the lower position, the dashpot 142 is provided and includes an air cylinder 182 that is secured to the extension 68 of the side wall 66. The air cylinder 182 receives a piston 184 therein and a spring 186 engages the outer end of the cylinder 182 and a collar 188 is secured adjacent the outer end of the piston 184. The outer end of the piston 184 is adapted to engage a groove 190 formed in the bracket 132 and it is seen that as the bracket assembly is released, movement of the piston 184 is retarded in the air cylinder 182 and the movement of the bracket assembly is thereby damped in its downward motion. The dash-pot 142 gradually lowers the bracket assembly and as soon as the fresh core moves into engagement with the traverse drum 24, the winding operation begins. It is seen that each of the individual winding units 20 is individually controlled and may be clutched out of engagement with the sprocket drive gear 45 associated therewith, as desired, by simply rotating the handle 104. The package that is wound on the core 118 is uniform and undue tensions on the core are avoided by providing for the taking up of the accumulated material during the core replacing operation.

It will be obvious to those skilled in the art that various changes may be made without departing from the spirit of the invention and therefore the invention is not limited to what is shown in the drawings and described in the specification but only as indicated in the appended claims.

What is claimed is:

1. In winding apparatus, a frame, drive means mounted on said frame, a traverse drum operatively connected to said drive means and rotated thereby, guide means engaging said drum and reciprocated thereby, said guide means guiding a continuously moving filament onto a core, said core engaging said drum for receiving said filament, the speed of rotation of said core being regulated by said drum during the winding operation, a motor drivingly engaging said core, a bracket mounted for pivotal movement on said frame, said motor being secured to said bracket and being pivotally movable therewith to move said core out of engagement with said drum during a core changing operation.

2. In extruding apparatus, a winding machine for winding a continuously extruded artificial filament, said winding machine comprising a frame, drive means mounted on said frame, a traverse drum operatively connected to said drive means and rotated thereby, guide means engaging said drum and reciprocated thereby, said guide means guiding said filament during the winding operation thereof, a bracket pivotally secured to said frame, a motor secured to said bracket and movable therewith, a core for receiving said filament operatively secured to said motor, said core engaging said drum during the filament winding operation and being drivingly controlled thereby, and movable with said bracket out of engagement with said drum when completely wound with said filament.

3. In extruding apparatus, a winding machine for winding a continuously extruded artificial filament, said winding machine including a core for receiving said filament in winding relation therearound, said core being drivingly secured to a motor, said motor and core being mounted for pivotal movement, drive means operatively engaging said core for controlling the rotation thereof during the winding operation, and means for pivotally moving said core out of engagement with said drive means when said core is completely wound and is to be replaced by a fresh core, said fresh core being driven by said motor for taking up the length of filament accumulated during the core-changing operation.

4. In a winding machine for winding a continuously moving filament, guide means for guiding said filament during the winding operation, said guide means including a mounting block having an opening formed therein, bearings positioned in said opening and receiving a bearing shaft for rotation therebetween, a spring secured to said bearing shaft and extending outwardly beyond said mounting block, and a follower arm mounted in said spring and rotatable therewith, said spring and follower arm being freely rotatable with said bearing shaft in said bearings.

5. In a multiple unit winding machine for simultaneously winding a plurality of continuously moving filaments, a portable frame, a plurality of winding units mounted on said frame in banks a drive drum for each of said winding units, each of said units receiving a group of said filaments for effecting the winding thereof, means for guiding said filaments to each of said winding units, said guiding means including a follower arm mounted on the associated winding unit for reciprocation, thereby causing said filaments to be helically wound in a package, and means for driving the drive drum of each of said winding units, said driving means including a plurality of interconnected parallel shafts secured to said frame, each of said shafts operatively engaging a drive drum in each of said banks.

6. In a multiple unit winding machine as set forth in claim 5, wherein each of said banks of winding units operatively engage a drive chain, said drive chain being driven by one of said shafts operatively connected thereto.

7. In a winding machine, a frame, drive means mounted on said frame, a driving drum mounted on said frame and adapted to be driven by said drive means, and means for clutching said drum into and out of driving engagement with said drive means, said clutching means including a clutch shaft journalled in said frame and rotatably receiving said drive means thereon, said drum being operatively secured to said clutch shaft, a clutch plate engaging said shaft and adapted to frictionally engage said drive means in driving relation therewith, a yoke operatively engaging said clutch plate and being pivotally mounted for effecting axial movement of said clutch plate, and cam means for pivotally moving said yoke, said cam means including a cam follower secured to said yoke, a cam shaft journaled in said frame, and a cam secured to said cam shaft and engaging said cam follower, said cam being rotated to pivotally move said yoke, thereby causing said clutch plate to engage said drive means for rotating said drum.

8. In a winding machine as set forth in claim 7, wherein said yoke is resiliently biased into engaging relation with said clutch plate for moving said clutch plate into engagement with said drive means.

9. In a winding machine, a frame, drive means mounted on said frame, a traverse drum mounted on said frame and operatively engaging said drive means for rotation thereby, a core frictionally engaging said traverse drum for rotation thereby, and guide means engaging said drum for guiding a continuously moving filament into winding relation with said core, said guide means including a block and a follower arm mounted for rotary movement in said block, said follower arm being formed with a finger for engaging a helical groove formed in said drum, said finger receiving said filament in guiding relation, and being reciprocated by rotation of said drum, said follower thereby oscillating in said block.

10. In a winding machine as set forth in claim 9, wherein a bearing shaft is positioned in said block, said bearing shaft having a spring secured thereto and extending outwardly from said block, said follower arm being secured in said spring and being biased thereby toward said helical groove formed in said drum.

11. In a winding machine as set forth in claim 9, wherein bearings are positioned in said block in spaced relation, a bearing shaft engaging said bearing and adapted to be rotated therebetween, said bearing shaft being operatively secured to said follower arm and rotated between said bearings in response to the reciprocating movement of said finger.

12. In a winding machine, a frame, drive means mounted on said frame, a traverse drum mounted on said frame and operatively engaging said drive means for rotation thereby, a bracket assembly pivotally mounted on said frame said bracket assembly including a bracket, an electric motor secured to said bracket, a core holder mounted on the shaft of said motor, and a filament receiving core secured to said core holder, said bracket assembly being pivotally movable from a latched position to a drive position whereby said core frictionally contacts said drum and is adapted to be drivingly controlled thereby.

13. In a winding machine as set forth in claim 12, wherein a dash-pot secured to said frame engages said bracket assembly and damps the bracket assembly in the movement thereof toward said drum, said bracket assembly being adapted to move said core into engagement with said drum under the influence of gravity.

14. In a method of winding a continuously moving filament on a core, comprising the steps of guiding said filament to said core, rotating said core for receiving said filament until a complete package is wound, moving the finished package to a core replacing position, replacing said finished package with a fresh core, rotating said fresh core prior to commencement of the winding operation to take up the length of filament accumulated during the core replacing operation, and moving said fresh core into the winding position for winding the filament thereon.

15. In a method of winding a continuously moving filament on a core, comprising the steps of guiding said filament to said core, rotating said core at a predetermined speed until a complete package is wound, moving the finished package out of the winding position, replacing said finished package with a fresh core, rotating said fresh core at a speed greater than the speed employed in the winding operation to take up the length of the filament accumulated during the core replacing operation, and moving said fresh core into the winding position for winding the filament thereon.

16. In a method of winding a continuously moving filament on a core, comprising the steps of guiding said filament to said core, rotating said core at a predetermined speed until a complete package is wound, moving the finished package to a core replacing position, replacing said finished package with a fresh core, rotating said fresh core prior to commencement of the winding operation at a speed greater than the speed employed in the winding operation to take up the length of filament accumulated during the core replacing operation, and moving said fresh core into the winding position for winding the filament thereon.

17. In a winding machine, a first driving member, a second driving member independently driven from said first driving member and at a different speed thereof, a filament receiving core carried by said second driving member and adapted to be normally driven thereby said core being movable into engagement with said first driving member, said first driving member thereafter controlling the drive of said second driving member to drive said core at the same speed thereof.

18. In a winding machine, a frame, drive means mounted on said frame, a driving drum mounted on said frame and adapted to be driven by said drive means, and means for clutching said drum into and out of driving engagement with said drive means, said clutching means including a clutch shaft journalled in said frame and rotatably receiving said drive means thereon, said drum being operatively secured to said clutch shaft, a clutch plate engaging said shaft and adapted to frictionally engage said drive means in driving relation therewith, a yoke operatively engaging said clutch plate and being pivotally mounted for effecting axial movement of said clutch plate, and cam means for pivotally moving said yoke, said cam means including a cam follower secured to said yoke, a cam shaft journalled in said frame, and a cam secured to said cam shaft and engaging said cam follower, said cam being formed with a bevelled face, whereby said cam follower is caused to be moved laterally when contacted by said bevelled face to pivotally move said yoke, thereby causing said clutch plate to engage said drive means for rotating said drum.

19. In a winding machine, a frame, drive means mounted on said frame, a traverse drum mounted on said frame and operatively connected to said drive means for rotation thereby, said traverse drum having a helical groove formed in the surface thereof, a follower arm being positioned in said groove in said traverse drum and adapted to be reciprocated upon rotation of said drum, said follower arm engaging a filament to be wound and guiding said filament during the winding operation thereof, a bracket pivotally mounted on said frame, an electric motor secured to said bracket and movable therewith, a core secured for rotation to said motor and adapted to receive said filament in winding relation therearound, said core being movable with said motor and bracket.

20. In winding apparatus, a frame, drive means mounted on said frame, a traverse drum operatively engaging said drive means and rotated thereby, a bracket pivotally mounted on said frame, a motor secured to said bracket for movement therewith, a core receiving a filament to be wound and engaging said drum, said drum controlling the drive of said core during the winding operation, said core being operatively secured to said motor and being normally driven thereby and movable with said motor and bracket out of engagement with said drum when it is to be replaced by a fresh core, said fresh core being rotated by said motor in the core changing position to take up the filament accumulated during the core changing operation.

21. In extruding apparatus, a winding machine for winding a continuously extruded artificial filament, said winding machine including a frame, a traverse drum mounted on said frame, drive means mounted on said frame for driving said drum, a core engaging said drum, the rotation of said core being controlled by said drum during the winding operation, said core receiving said filament in winding relation thereon, said core being pivotally mounted on said frame and being movable out of engagement with said drum when said core is completely wound and is to be replaced by a fresh core, and means for normally rotating said fresh core for taking up the filament accumulated during the core-changing operation when said core is out of engagement with said drum.

22. In a winding machine for winding a continuously moving filament, a frame, a core mounted for pivotal movement on said frame and receiving said filament in winding relation thereon, means operatively connected to said core for continuously rotating said core, means frictionally engaging said core for controlling the rotation of said core during the winding operation, and means for pivotally moving said core out of engagement with said controlling means, said rotating means being adapted to rotate said core when initially connected thereto and prior to engaging said controlling means for taking up the length of filament accumulated due to the continuous movement of said filament.

23. In a winding machine as set forth in claim 22, which further includes means for guiding said filament during the winding operation, said guide means operatively engaging said controlling means and being traversed thereby, said guide means being operatively connected to bearing means which provide for the traversing movement of said guide means.

24. In a winding machine as set forth in claim 22, wherein means are provided for driving said controlling means, said driving means operatively engaging clutch means for discontinuing the rotation of said controlling means, thereby discontinuing the winding operation.

25. In winding apparatus, a multiple unit winding machine comprising a frame, a plurality of winding units mounted on said frame, each of said winding units including a core for winding a filament thereon and a motor for rotating said core, means for driving said cores, said driving means including a plurality of drive gears arranged in banks, a drive chain engaging said drive gear in each of said banks, means for rotating said chains, said rotating means comprising a plurality of interconnected parallel shafts, each of said shafts being operatively connected to a drive chain through a gear secured thereto, and a motor pivotally mounted on each of said winding units.

26. In winding apparatus as set forth in claim 25, wherein said parallel shafts are each provided with spaced gears, each of said spaced gears driving one of said chains, thereby rotating said drive gears in said banks.

27. In a winding machine, a frame, drive means mounted on said frame, a first driving member mounted on said frame in driving engagement with said drive means, a second driving member mounted on said frame and being independently driven, a core engaging said second driving member and adapted to be normally driven thereby, said core and second driving member being movable as a unit to move said core into engagement with said first driving member, said first driving member thereafter controlling the drive of said second driving member to drive said core at the same speed thereof.

28. In a winding machine as set forth in claim 27, wherein said second driving means is rotated at a greater speed than said first driving means.

References Cited in the file of this patent

UNITED STATES PATENTS

| | | |
|---|---|---|
| 459,039 | Foster | Sept. 8, 1891 |
| 2,729,051 | Clarkson | Jan. 3, 1956 |
| 2,740,590 | Keith | Apr. 3, 1956 |

FOREIGN PATENTS

| | | |
|---|---|---|
| 319,493 | France | July 24, 1902 |
| 323,200 | France | Oct. 31, 1902 |
| 121,075 | Switzerland | Aug. 1, 1927 |